United States Patent
Uziel et al.

(10) Patent No.: US 12,482,231 B2
(45) Date of Patent: Nov. 25, 2025

(54) CLASSIFICATION BY VISION-LANGUAGE MODEL WITH OPTIMIZED TEXT EMBEDDINGS

(71) Applicant: GM GLOBAL TECHNOLOGY OPERATIONS LLC, Detroit, MI (US)

(72) Inventors: Roy Uziel, Herzliya (IL); Oded Bialer, Petah Tikva (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 18/359,397

(22) Filed: Jul. 26, 2023

(65) Prior Publication Data

US 2025/0037424 A1     Jan. 30, 2025

(51) Int. Cl.
*G06V 10/764*      (2022.01)
*G06F 40/56*      (2020.01)
*G06V 10/774*      (2022.01)

(52) U.S. Cl.
CPC ............ *G06V 10/764* (2022.01); *G06F 40/56* (2020.01); *G06V 10/774* (2022.01)

(58) Field of Classification Search
CPC .... G06V 10/764; G06V 10/774; G06V 10/82; G06F 40/56; G06F 16/5846; G06N 3/0455; G06N 3/0464; G06N 3/084; G06N 3/088
See application file for complete search history.

(56) References Cited

U.S. PATENT DOCUMENTS

| | | | |
|---|---|---|---|
| 12,288,380 B2 * | 4/2025 | Li | G06V 10/803 |
| 2019/0130220 A1 * | 5/2019 | Zou | G06F 18/2413 |
| 2022/0383048 A1 * | 12/2022 | Fei | G06F 40/44 |
| 2023/0237773 A1 * | 7/2023 | Li | G06F 40/30 |
| | | | 382/155 |
| 2023/0259544 A1 * | 8/2023 | Sotudeh Gharebagh | ............ |
| | | | G06F 18/22 |
| 2023/0386646 A1 * | 11/2023 | Tanwani | G06V 10/806 |
| 2024/0169629 A1 * | 5/2024 | Tschannen | G06T 11/60 |
| 2024/0378859 A1 * | 11/2024 | He | G06V 10/774 |

FOREIGN PATENT DOCUMENTS

WO    WO-2023204944 A1 * 10/2023 ............ G16H 15/00

OTHER PUBLICATIONS

Li, Kunpeng, et al. "Image-text embedding learning via visual and textual semantic reasoning." IEEE transactions on pattern analysis and machine intelligence 45.1 (2022): 641-656.*
Zhang, Huang, Jin, Lu; Vision-Language ModelsforVision Tasks: A Survey; Journal of Latex Class Files arXiv preprint arXiv:2304.00685, Mar. 2023.

* cited by examiner

*Primary Examiner* — Shefali D Goradia
(74) *Attorney, Agent, or Firm* — Quinn IP Law (57) ABSTRACT

Herein, a technology that facilitates the optimization of vision-language (VL) based classifiers with text embeddings is discussed. The technology includes tuning the VL-based classifier employing a pre-trained image encoder of a visual-language model (VLM) for imaging embedding of pre-classified images and a pre-trained textual encoder of the VLM for textual embedding of a set of differing textual sentences. The technology further includes determining an optimized set of differing textual sentences of a superset of textual sentences. The optimized set of differing textual sentences has a minimal classification loss of the VL-based classifier when classifying the pre-classified images.

20 Claims, 3 Drawing Sheets

CLASSIFICATION BY VISION-LANGUAGE MODEL WITH OPTIMIZED TEXT EMBEDDINGS

INTRODUCTION

A visual-language model (VLM) is a computerized model that combines computer vision and natural language processing techniques to generate content related to visual data. VLMs often use a visual encoder to extract features from visual input and a language decoder to generate textual descriptions or responses. These models are trained on paired visual and textual data. These models can perform tasks like image captioning and visual question answering. They facilitate the understanding and generation of text based on visual content, bridging the gap between visual and textual modalities.

SUMMARY

According to one embodiment, a method that facilitates optimization of vision-language (VL) based classifier with textual embedding. The method includes tuning the VL-based classifier employing a pre-trained image encoder of a visual-language model (VLM) for imaging embedding of pre-classified images and a pre-trained textual encoder of the VLM for textual embedding of a set of differing textual sentences. The method also determines an optimized set of differing textual sentences of a superset of textual sentences. The optimized set of differing textual sentences has a minimal classification loss of the VL-based classifier when classifying the pre-classified images. The method further includes providing an optimized set of differing textual sentences for use with the VL-based classifier in classifying unclassified images.

In this embodiment of the method, the tuning includes the generation of the image embedding from an image encoding of the pre-classified images using the pre-trained image encoder and the generation of the textual embedding from a textual encoding of the set of differing textual sentences using the pre-trained textual encoder. The tuning also includes classifying, by the VL-based classifier, the pre-classified labeled images into one or more of multiple classifications based upon a correlation of the image embedding and textual embedding and determining classification loss of the pre-classified images based, at least in part, on the set of textual sentences.

With this embodiment of the method, the tuning includes image encoding pre-classified images using the pre-trained image encoder and generating an image embedding vector (x) from the output of the image encoding. The tuning also includes textual encoding the set of textual sentences using the pre-trained textual encoder and generating a textual embedding vector matrix (W) from the output of the textual encoding. The tuning further includes correlating the image embedding vector and textual embedding vector matrix to produce a projection matrix (Wx) and classifying the pre-classified labeled images by the VL-based classifier into one or more of multiple classifications based upon the projection matrix. The tuning still further includes determining classification loss of the pre-classified images based, at least in part, on the set of textual sentences.

With this embodiment of the method, wherein the determining includes iteratively repeating the tuning of the VL-based classifier, where each iteration includes supplying another set of differing textual sentences of the superset of textual sentences. Each set of differing textual sentences includes at least one iteratively unique textual sentence of the superset. The determining also includes, for each iteration, tracking a classification loss associated with each iteration's set of differing textual sentences. The determining further includes identifying the optimized set of differing textual sentences of the superset associated with the minimal classification loss of the VL-based classifier when classifying the pre-classified images.

With this embodiment of the method, wherein the determining includes employing an automated textual sentence generator.

In this embodiment of the method, the automated textual sentence generator is selected from a group consisting of language models (LMs), large language models (LLMs), Markov models (MMs), recurrent neural networks (RNNs), transformers, template-based generators, rule-based generators, reinforcement learning (RL) based generators, and random word generators.

In this embodiment of the method, wherein the determining the classification loss includes calculating a cross-entropy loss set of differing textual sentences of a superset of textual sentences.

Another embodiment of the method that includes determining an optimal bias ("$\theta$") of the VL-based classifier with the optimized set of differing textual sentences, wherein the optimal bias is associated with the minimal classification loss of the VL-based classifier when classifying the pre-classified images.

According to yet another embodiment, a non-transitory machine-readable storage medium encoded with instructions executable by one or more processors that, when executed, direct one or more processors to perform operations of the VL-based classifier produced by an embodiment of the method introduced above. The VL-based classifier employs the optimized set of differing textual sentences for use with the VL-based classifier in classifying unclassified images.

According to yet another embodiment, a method that facilitates optimization of vision-language (VL) based classifier with textual embedding, the method includes tuning the VL-based classifier employing a pre-trained image encoder of a visual-language model (VLM) for imaging embedding of pre-classified images and a pre-trained textual encoder of the VLM for textual embedding of a set of differing textual sentences. The method also determines an optimized set of differing textual sentences of a superset of textual sentences. The optimized set of differing textual sentences has a minimal classification loss of the VL-based classifier when classifying the pre-classified images. The determining includes employing an automated textual sentence generator. The method further includes providing the optimized set of differing textual sentences for use with the VL-based classifier in classifying unclassified images.

Another embodiment of the method, wherein the tuning includes generating the image embedding from an image encoding of the pre-classified images using the pre-trained image encoder and generating the textual embedding from a textual encoding of the set of differing textual sentences using the pre-trained textual encoder. The tuning also includes classifying the pre-classified labeled images by the VL-based classifier into one or more of multiple classifications based on a correlation of the image embedding and textual embedding. The tuning further includes determining classification loss of the pre-classified images based, at least in part, on the set of textual sentences. Determining the classification loss includes calculating a cross-entropy loss set of differing textual sentences of a superset of textual sentences.

Another embodiment of the method, wherein the determining includes iteratively repeating the tuning of the VL-based classifier. Each iteration includes supplying another set of differing textual sentences of the superset of textual sentences, and each set of differing textual sentences includes at least one iteratively unique textual sentence of the superset. The determining also includes, for each iteration, tracking a classification loss associated with each iteration's set of differing textual sentences. The determining further includes identifying the optimized set of differing textual sentences of the superset associated with the minimal classification loss of the VL-based classifier when classifying the pre-classified images.

Another embodiment of the method, wherein the minimal classification loss is associated with the optimized set of differing textual sentences that is characterized as having the most minor classification loss produced by the VL-based classifier when classifying the pre-classified images compared with other sets of the subset.

Another embodiment of the method, wherein the pre-classified images, encoded by the image embedding when tuning the VL-based classifier consists of twenty or fewer images.

According to yet another embodiment, a non-transitory machine-readable storage medium encoded with instructions executable by one or more processors that, when executed, direct one or more processors to perform operations that facilitate optimization of vision-language (VL) based classifier with textual embedding, the operations include tuning the VL-based classifier employing a pre-trained image encoder of a visual-language model (VLM) for imaging embedding of pre-classified images and a pre-trained textual encoder of the VLM for textual embedding of a set of differing textual sentences. The operations also include determining an optimized set of differing textual sentences of a superset of textual sentences. The optimized set of differing textual sentences has a minimal classification loss of the VL-based classifier when classifying the pre-classified images. The determining includes employing an automated textual sentence generator. The operations include providing the optimized set of differing textual sentences for use with the VL-based classifier to classify unclassified images.

Another non-transitory machine-readable storage medium embodiment in which the operations further include generating the image embedding from an image encoding of the pre-classified images using the pre-trained image encoder and generating the textual embedding from a textual encoding of the set of differing textual sentences using the pre-trained textual encoder. The operations also include classifying the pre-classified labeled images by the VL-based classifier into one or more of multiple classifications based upon a correlation of the image embedding and textual embedding. The operations further include determining classification loss of the pre-classified images based, at least in part, on the set of textual sentences. Determining the classification loss includes calculating a cross-entropy loss set of differing textual sentences of a superset of textual sentences.

Another non-transitory machine-readable storage medium embodiment in which the operations further include iteratively repeating the tuning of the VL-based classifier, where each iteration includes supplying another set of differing textual sentences of the superset of textual sentences. Each set of differing textual sentences includes at least one iteratively unique textual sentence of the superset. The operations also include, for each iteration, tracking a classification loss associated with each iteration's set of differing textual sentences. The operations include identifying the optimized set of differing textual sentences of the superset associated with the minimal classification loss of the VL-based classifier when classifying the pre-classified images.

Another non-transitory machine-readable storage medium embodiment in which the automated textual sentence generator is selected from a group consisting of language models (LMs), large language models (LLMs), Markov models (MMs), recurrent neural networks (RNNs), transformers, template-based generators, rule-based generators, reinforcement learning (RL) based generators, and random word generators.

Another non-transitory machine-readable storage medium embodiment in which the minimal classification loss is associated with the optimized set of differing textual sentences that is characterized as having the minor classification loss produced by the VL-based classifier when classifying the pre-classified images in comparison with other sets of the subset.

DETAILED DESCRIPTION

The technology described herein facilitates the optimization of vision-language (VL) based classifiers with text embeddings. With the technology described herein, a VL-based classifier may classify complex scenarios in which understanding the content and their relationships is part of the classification. And this may be done so effectively with only a few (e.g., fewer than twenty) training samples.

Referring now to the drawings, wherein like numerals indicate like parts in the several views of various systems and approaches are shown and described herein. Disclosed approaches may be suitable for use with automotive vehicles, which include manual, autonomous, and semi-autonomous driving.

Figure 1:
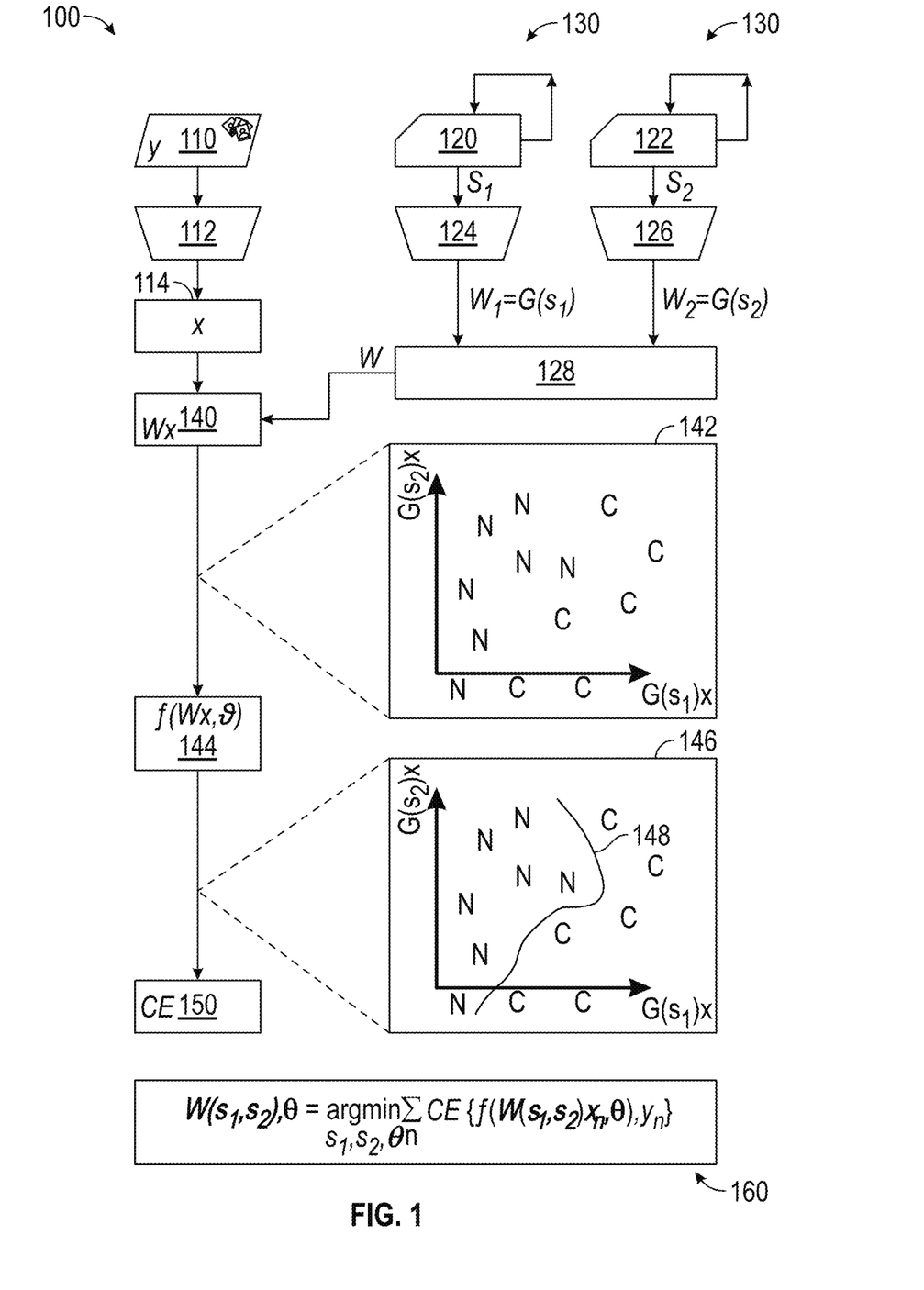
FIG. 1 illustrates a dataflow diagram of an example system that facilitates the optimization of vision-language (VL) based classifiers with text embeddings in accordance with one or more implementations described herein.

FIG. 1 illustrates a dataflow diagram of an example system 100 that facilitates the optimization of VL-based classifiers with text embeddings. In accordance with at least some aspects of the technology described herein, system 100 produces a VL-based classifier with optimized text embeddings to categorize images (or other visual information) based on a complex classification of the content of those images.

Complex classification, also known as multi-class or multi-label classification, is a machine-learning (ML) task where an input instance is assigned one or more labels from a set of multiple possible labels. Multi-class classification assigns a single label to an input instance, while multi-label classification allows multiple labels simultaneously. A categorization based upon a higher-level understanding of the context of and the relationships between the content of the images is an example of complex classification.

The example of complex classification described herein involves categorizing images of pedestrians near roadways as either a pedestrian that intends to cross the road or not. Thus, the key question is does a pedestrian in the image intend to cross a road? Examples of visual information in the images that may be relevant to answering this key question include: the pedestrian, their proximity to a road, how the pedestrian is facing the road, the pedestrian's pose, the pedestrian's gaze, other nearby actors, and location of traffic objects (e.g., crossroad, traffic light, crosswalk).

The technology described herein utilizes a visual-language model (VLM), also called a vision-and-language model. A VLM is a computerized model that integrates visual and textual information to understand and generate content. It combines computer vision techniques with natural language processing (NLP) to bridge the gap between visual and textual data modalities.

VLMs aim to process and generate text that describes or relates to visual content, such as images, videos, or scenes. They can perform tasks such as image captioning, visual question answering, image generation from textual descriptions, and image-text matching.

These models typically have two main components: a visual encoder and a language encoder/decoder. Herein, image encoder 112 is the visual encoder, and textual encoders 124, 126 are the language encoders. The visual encoder processes the visual input, extracting meaningful features or representations from the visual data. This can be done using convolutional neural networks (CNNs) or other computer vision models.

In some implementations, a language decoder takes the visual features and generates textual descriptions or responses. It utilizes techniques from natural language processing and can be based on recurrent neural networks (RNNs), transformers, or other language models.

VLMs are trained on large-scale datasets that contain paired visual and textual data. For example, an image captioning dataset consists of images paired with corresponding textual descriptions. The models are trained to learn the relationship between visual and textual data, enabling them to generate relevant and meaningful text based on visual input.

As depicted in FIG. 1, system 100 includes image dataset 110 (such as pre-classified images y; each image is $y_n$); a pre-trained image encoder 112 of a VLM (VLM); an image embedder 114; a pair of automated sentence generators 120, 122 and their accompanying pre-trained textual encoders 124, 126 of the VLM; a textual embedder 128; an image-text correlator 140; a VL-based classifier 144; and a loss-checker 150. These components of system 100 work together to optimize the VL-based classifier 144 to find an optimized set of differing textual sentences for use with the VL-based classifier to make complex classifications of unclassified images.

As part of the tuning of the VL-based classifier 144, system 100 employs the pre-trained image encoder 112 for imaging embedding (by the image embedder 114) of pre-classified images (y) and one or more pre-trained textual encoders (such as encoders 124, 126) of the VLM for textual embeddings (by the textual embedder 128) of a set of differing textual sentences produced by the sentence generators 120, 122.

As used herein, the training of the VL-based classifier 144 includes multiple iterations of the tuning of VL-based classifier 144. Each iteration has, at least, a set of differing textual sentences that differ from the others of a superset of textual sentences. The superset of textual sentences includes all sets of differing sentences iteratively tuned during the overall training of the VL-based classifier 144. The VL-based classifier 144 is trained to get a high resemblance between the positive input images (e.g., the image dataset) and an optimized set of differing textual sentences. Herein, a positive input image matches a particular classification (e.g., intent to cross the road).

In training the VL-based classifier 144, the system 100 iteratively tunes the classifier with iteratively changing sets of differing textual sentences produced by the sentence generators 120, 122. The sets of differing textual sentences are collectively called the superset of textual sentences. During the training, system 100 determines an optimized set of differing textual sentences of the superset of textual sentences. The optimized set of differing textual sentences is those that have a minimal classification loss of the VL-based classifier when classifying the pre-classified images. That is, the optimized set of differing textual sentences has the lowest classification loss amongst the others of the superset.

During tuning, the pre-trained image encoder 112 of the VLM receives a pre-classified (e.g., labeled) image ($y_n$) of the image dataset 110. This is, for example, done one image at a time. The collection (y) of the pre-classified labeled images may be called the ground truth. In the context of classification tasks, the ground truth label of an image refers to the true or correct class label associated with a data point in a labeled dataset. It represents the known or annotated class of the data point.

A pre-trained (also known as "frozen") encoder is part of a VLM. The pre-trained encoder is trained on a large dataset in an unsupervised manner to learn meaningful visual and data representations. These representations capture contextual information and can be used in transfer learning for various natural language understanding tasks.

During the training and evaluation of a classifier, the pre-classified labels serve as the reference or target values against which the classifier's predictions are compared. The classifier aims to learn from the training data and accurately predict the class labels for new, unseen data points.

For example, suppose you have a dataset of images with labels indicating whether each image depicts a pedestrian that intends to cross the road (C) or not (N). The pre-classified labels would specify the correct class for each image, such as "C" or "N." These labels are typically provided by humans that manually annotate the dataset or use other reliable means.

During training, the classifier attempts to learn the underlying patterns and features in the data that correlate with the correct class labels. The classifier adjusts its internal parameters based on the discrepancy between its predictions and the pre-classified labels, aiming to minimize the prediction error or loss.

The image embedder 114 receives the output from the image encoder 112, and, as part of the tuning, it generates an image embedding vector (x). An embedding vector (i.e., an embedding) is a numerical representation of an object or entity in an ML model. It is commonly used to represent discrete or categorical variables, such as words or images, in a continuous and dense vector space.

The purpose of an embedding vector is to capture the underlying relationships and semantics of the objects being represented. By mapping objects into a continuous vector space, embeddings enable ML models to reason and make predictions based on the relationships between the vectors.

Text embeddings are one of the most common types of embeddings. They are used to represent words in natural language processing tasks. Word embeddings encode semantic and syntactic information about words by considering their co-occurrence patterns in a large corpus of text.

Embedding vectors can also represent other types of objects, such as images. In image processing, convolutional neural networks (CNNs) can be used to learn embeddings that capture the visual features of images. These embeddings can be used for tasks like image classification, object detection, or image retrieval.

As part of the tuning, each of the pre-trained textual encoders 124, 126 of the VLM receives a textual sentence (e.g., $s_1$ and $s_2$) generated by their associated automated sentence generators 120, 122, respectively. As used herein, a textual sentence is a collection of multiple words (e.g., in English) or other semantic indicators/symbols. A textual sentence does not necessarily need to adhere to linguistic syntactic or grammatical rules. Examples of acceptable textual sentences include: "Photo of a person running while facing away." "Person on the sidewalk staring directly towards the vehicle," "Talking on the phone with a stroller," and "Walking bicycle helmet off."

The automated sentence generators 120, 122 may be implemented in various manners. They can be categorized into several types based on their underlying techniques and capabilities. For example, the automated sentence generators may be implemented in one or more of the following manners: language models (LMs), large language models (LLMs), Markov models (MMs), recurrent neural networks (RNNs), transformers, template-based generators, rule-based generators, reinforcement learning (RL) based generators, or random-word generators.

The automated sentence generators of LMs and LLMs generate text by predicting the next word or sequence of words based on the input context. They can be trained on large amounts of text data and are often used for tasks like language modeling, text completion, and text generation.

The automated sentence generators of MMs generate text based on the statistical properties of the input data. They utilize Markov chains to model the likelihood of transitioning from one word or state to another. Markov models are relatively simple but can generate coherent text based on the patterns learned from the training data.

The automated sentence generators of RNNs generate text by processing sequential data. Their memory component allows them to capture dependencies across time steps. RNNs are commonly used for text generation, machine translation, and sentiment analysis tasks.

The automated sentence generators of transformers excel at capturing long-range dependencies and have been successfully applied to tasks like machine translation, question answering, and text generation.

Template-based generators use predefined templates or patterns to generate text. They can fill in the placeholders or variables within the template with appropriate words or phrases based on certain rules or conditions. Template-based generators are commonly used for generating structured text like form letters or repetitive content.

Rule-based generators generate text based on explicit rules or instructions. These rules can specify the structure, grammar, or logic that governs the generation process. Rule-based generators are often used for specific domains or tasks where the generation process can be well-defined.

Reinforcement learning (RL) based generators use reinforcement learning techniques to generate text. The model learns from an evaluator's reward signal based on the generated text's quality or relevance. RL-based generators can be trained to optimize objectives like fluency, coherence, or adherence to specific criteria.

Random-word generators do precisely that. They may randomly pick a word from one or more sets of words. Such words are typically curated to be related to the anticipated classification.

In the training of the VL-based classifier 144, the automated sentence generators iteratively adjust or change the sentences they generate for each iteration. Loops 130 of the automated sentence generators 120, 122 represent this iterative sentence adjustment.

In some implementations, both automated sentence generators have the same prompt sentence. For example, the prompt sentence may be "a photo of a person." In other instances, they may be given different prompt sentences.

In some implementations, system 100 alternatively adjusts one sentence at a time by adding or changing one or more words in a sentence. For example, in one iteration, automated sentence generator 120 adds a word to sentence $s_1$, while automated sentence generator 122 leaves sentence $s_2$ unchanged. In the next iteration of the training, automated sentence generator 122 adds a word to sentence $s_2$ while automated sentence generator 120 sentence $s_1$ unchanged.

System 100, as described, includes two differing sentences (e.g., $s_1$ and $s_2$) for the source of its textual embedding. This described implementation has a binary classification. Each image depicts a pedestrian intending to cross the road (C) or not (N). However, other implementations of the technology described herein may employ more than just two classifications. Accordingly, the set of differing sentences may include a matching number of sentences as the source of its textual embedding. Thus, the number of sentences in the set matches the number of dimensions to the feature space upon which the classifier acts.

The textual encoders 124, 126 receive a textual sentence (e.g., $s_1$ and $s_2$) from their associated automated sentence generators 120, 122, respectively. Each encoder encodes its associated output, which is mathematically indicated with a G. For example, textual encoder 124 generates output $w_1 = G(s_1)$ from sentence $s_1$ from sentence generator 120, and textual encoder 126 generates output $w_2 = G(s_2)$ from sentence $s_2$ from sentence generator 122.

The textual embedder 128 receives the outputs from the textual encoders 124, 126, and, as part of the tuning, it generates a textual embedding vector matrix (W) from the output of each textual encoder. Thus, the textual embedding vector matrix may be represented as a $W(s_1, s_1)$ = matrix of $G(s_1)$ and $G(s_2)$.

As part of the tuning, the image-text correlator 140 correlates the image-embedding vector and textual embedding vector matrix to produce a projection matrix (Wx). A projection matrix is a square matrix that transforms vectors into a lower-dimensional subspace by projecting them onto a smaller space.

The projection matrix (Wx) is a two-dimensional space with two axes: X-axis is $G(s_1)x$, and Y-axis is $G(s_2)x$. This two-dimensional space is a high-level semantic feature space visually depicted in a high-level semantic feature-space chart 142. Generally, a high-level semantic feature space refers to a representation of data that captures the meaning or semantic content of the data at a higher level of abstraction. In various fields, including natural language processing (NLP), computer vision, and audio processing, high-level semantic feature spaces extract, and represent essential semantic information from raw data.

A high-level semantic feature-space in natural language processing may involve word embeddings or contextual word representations obtained from pre-trained language models. These embeddings encode the meaning of words or sentences in a dense vector space, allowing for better semantic understanding and downstream NLP tasks such as text classification, sentiment analysis, and question answering.

In computer vision, high-level semantic feature spaces can be obtained by extracting features from deep CNNs. These CNNs are trained on large image datasets and learn to recognize high-level visual patterns, objects, and concepts. Using these features, image data can be represented in a compact and semantically meaningful space, enabling tasks like image classification, object detection, and image captioning.

The high-level semantic feature-space chart 142 shows that the X-axis is $G(s_1)x$ and Y-axis is $G(s_2)x$. The letters C ("C") in the chart represent the location in the feature space of the images of the pre-classified ground truth images (y) that represent a pedestrian who does intend to cross the road. The letters N ("N") in the chart represent the location in the feature space of the images of the pre-classified ground truth images that represent a pedestrian who does not intend to cross the road. Of course, this is known because the input images are ground truth and thus pre-classified.

As part of the tuning, the VL-based classifier 144 classifies the pre-classified labeled images from image dataset 110 into one or more of multiple classifications based upon the projection matrix. This may be accomplished using a Multi-Layer Perceptron (MLP) with parameter "theta" ($\theta$) and represented by $f(Wx,\theta)$. An MLP is an artificial neural network with multiple layers of interconnected neurons. It consists of an input layer that receives data, one or more hidden layers that process the data using activation functions, and an output layer that generates predictions. MLPs learn from data by adjusting weights and biases through optimization approaches, like gradient descent and backpropagation. They are versatile models used for classification, regression, and pattern recognition tasks, but other deep learning architectures like CNNs and RNNs have gained popularity for specific applications.

The results of this classification are seen in decision boundary chart 146, which is just like chart 142 except that it shows a decision boundary 148. This decision boundary is a graphical representation of $f(Wx,\theta)$, the classification. Graphically, the decision boundary 148 separates the Cs from the Ns.

VL-based classifier 144 may also be called a classification network. Such a classifier is a type of ML model designed to solve classification problems. Classification is the task of assigning input data points to predefined categories or classes.

The architecture of a classifier typically consists of an input layer, one or more hidden layers, and an output layer. Each layer is composed of multiple interconnected nodes called neurons. The input layer receives the raw input data, which is then processed through the hidden layers, and finally, the output layer produces the classification result.

The hidden layers of a classifier perform a series of computations, transforming the input data in a non-linear manner to extract relevant features and patterns. Each neuron in a hidden layer takes a weighted sum of the outputs from the previous layer, applies an activation function to introduce non-linearity, and passes the result to the next layer. This process allows the network to learn complex relationships between the input data and the corresponding class labels.

The output layer of a classifier typically consists of one neuron per class, using an activation function that produces a probability score for each class. The class with the highest probability is the predicted class for a given input.

During training, a classifier (such as VL-based classifier 144) learns its neurons' optimal weights and biases by iteratively adjusting them to minimize a loss function that quantifies the difference between the predicted class labels and the true class labels in the training data. The classifier learns from a training dataset (such as ground truth images y), where each input data point is associated with a known class label. During training, the classifier adjusts its internal parameters based on the input-output pairs in the training data to improve its ability to classify unseen data correctly.

Once trained, a classification neural network can predict the class labels for new, unseen data points by feeding them through the network and obtaining the output from the output layer.

In the context of a classifier, "theta" ($\theta$) typically refers to the parameters or weights of the classification network (i.e., classifier). Herein, "theta" ("$\theta$") is described as the optimal bias that is associated with the minimal classification loss of the VL-based classifier when classifying the pre-classified images.

These parameters are learned during the training process. In a feedforward neural network, a common classification network type, the parameters include the weights and biases associated with the connections between neurons. Each connection has a weight value that determines the strength of the connection, and each neuron has a bias term that allows the network to learn different representations.

The weights and biases collectively form the parameter vector, often denoted as "theta" ($\theta$). This vector represents tunable parameters in the classification network (i.e., classifier). The values of the optimal bias ($\theta$) are optimized during training to minimize a loss function that quantifies the discrepancy between the predicted outputs and the true labels.

By updating the values of optimal bias ($\theta$), the classification network (i.e., classifier) learns to adjust the strengths of connections and the biases of neurons, gradually improving its ability to classify input data accurately. The technology described herein determines an optimal bias ("$\theta$") of the VL-based classifier with the optimized set of differing textual sentences. The optimal bias is associated with the minimal classification loss of the VL-based classifier when classifying the pre-classified images.

In the tuning, the loss-checker 150 calculates (e.g., determines) the classification loss of a pre-classified image for each iteration based, at least in part, upon a unique combination of different sentences (e.g., $s_1$ and $s_2$). The loss-checker 150 employs a cross-entropy (CE) loss calculation to determine classification loss or error. Cross-entropy loss, also known as log loss or logistic loss, is a commonly used loss function in classification tasks, particularly in binary classification or multi-class classification problems. It quantifies the discrepancy between the predicted probabilities and the true class labels.

In binary classification, the cross-entropy loss measures the dissimilarity between the predicted probability of the positive class and the true binary label, which can take values of either 0 or 1.

In multi-class classification, where there are more than two classes, the cross-entropy loss is extended to handle multiple classes. Each class has its own predicted probability, and the true label is represented as a one-hot encoded vector.

The cross-entropy loss function encourages the predicted probabilities to be as close as possible to the true labels. It penalizes both confident incorrect predictions (where the predicted probability is far from the true label) and uncertain predictions (where the predicted probability is close to 0.5).

During the training process, the cross-entropy loss is used as an optimization objective to guide the learning of the classifier. The goal is to minimize the average cross-entropy loss across training samples. For example, to minimize cross-entropy loss between the output of the classification probability (e.g., from VL-based classifier 144) and the pre-classified label probability.

During the training, the loss checker 150 employs backpropagation, a supervised learning approach to train artificial neural networks. It involves a forward pass to compute predictions, followed by a backward pass to calculate gradients of the weights and biases concerning the loss function. These gradients are used to update the parameters in the network, aiming to minimize the error between predicted and actual outputs. By iteratively adjusting the weights and biases, backpropagation helps neural networks learn from data and make accurate predictions on new examples.

As shown in FIG. 1, equation 160 depicts the optimization calculation performed with each iteration of the classifier tuning. This formula helps calculate the combination of sentences (e.g., s1 and s2) that results in the lowest (i.e., minimal) classification loss of all the sentence combinations tried. Using this formula helps find the optimized set of differing sentences of the superset (all the combinations used in training) based on the optimized set producing the lowest (i.e., minimal) classification loss of the superset. The cross-entropy (CE) loss calculation determines the classification loss.

Figure 2:
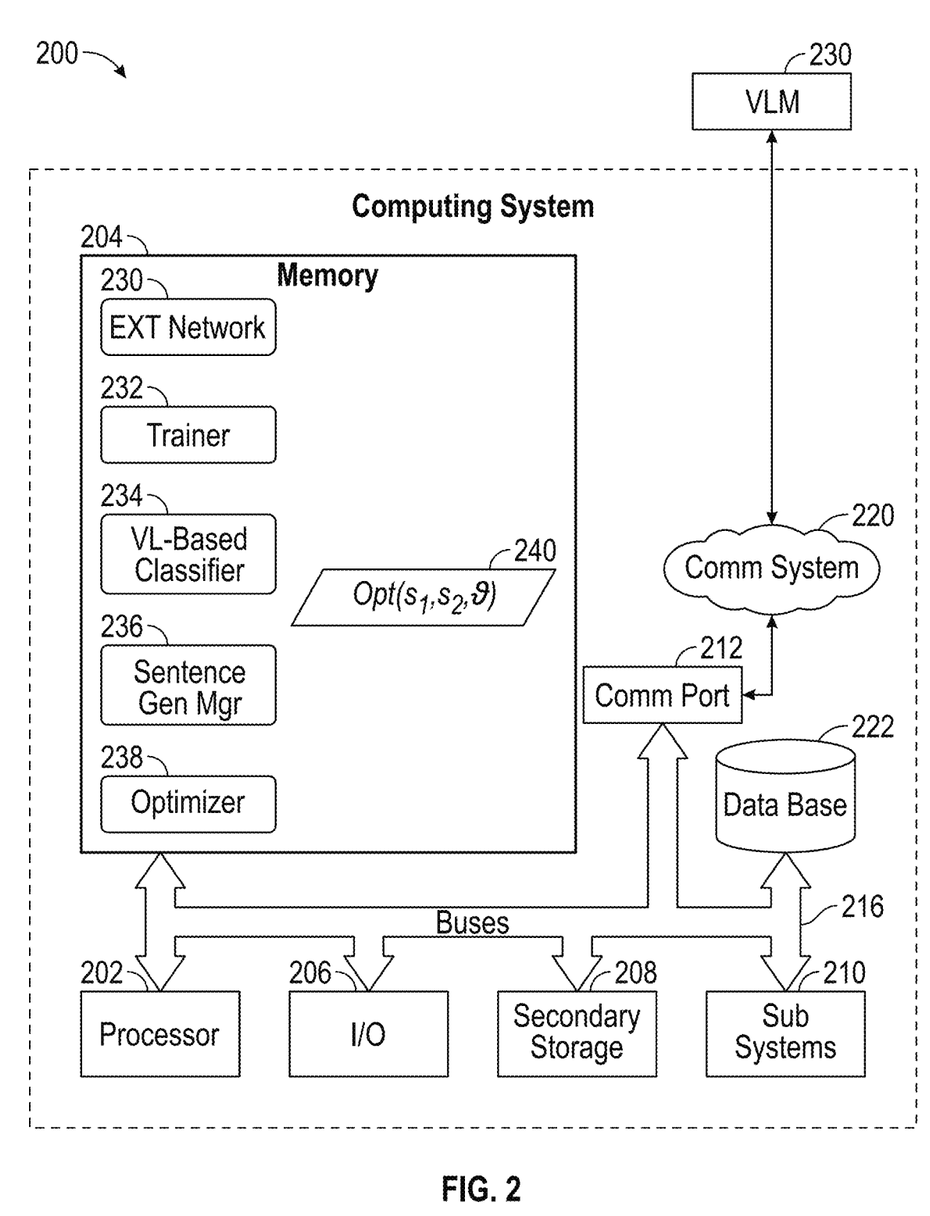
FIG. 2 illustrates an example of computer architecture for a computing system capable of executing the technology described herein.

FIG. 2 illustrates an example of computer architecture for a computing system 200 capable of executing the technology described herein. The computer architecture in this figure illustrates a typical computer, server computer, workstation, desktop computer, laptop, tablet, network appliance, e-reader, smartphone, embedded system, or another computing device. While shown as a single discrete device, the computing system 200 may be part of a distributed and interconnected set of components that accomplish the same functions.

The computing system 200 includes a processor 202 (e.g., central processor unit or "CPU"), system storage (e.g., memory) 204, input/output (I/O) devices 206—such as a display, a keyboard, a mouse, a microphone, a camera, and associated controllers, a secondary storage system 208 (e.g., a hard drive), and various other subsystems 210. In various embodiments, the computing system 200 also includes a communications ("comm") port 212, operable to connect to a communications ("comm") system 220. The computing system 200 may include or be connected to database 222, which contains the image datasets. The preceding components may be interconnected via one or more buses 216 and/or comm system 220.

The comm system 220 enables internal communications within computing system 200 and external wireless communications with devices and networks external to the system, such as with an external communication network 230. Internal communication may be, for example, via a local area network. The external wireless communication may include, for example, one or more of the following: satellite communications, WI-FI™, BLUETOOTH™, cellular communications, radio communications, and/or Internet communications.

System memory 204 may store data and machine-readable instructions (e.g., computer-readable instructions). Machine-readable instructions may configure the computing system 200. Machine-readable instructions may include one or more instruction modules. The instruction modules may include computer program modules. The instruction modules may include one or more of a VLM 230, a trainer 232, a VL-based classifier 234, a sentence generation manager 236, an optimizer 238, and/or other instruction-based modules.

While the modules in the example depicted by this figure are implemented using machine-readable instructions, other similarly functioning modules may be implemented using little to no machine-readable instructions. Such modules are implemented via hardware (e.g., circuitry) and analog and/or digital signals. In other instances, such modules may be implemented via a combination of hardware and machine-implemented instructions.

VLM 230 is a visual-language model (VLM). The VLM 230 is configured to include the functionality of a pre-trained image encoder (such as image encoder 112) and one or more pre-trained textual encoders (such as textual encoders 122, 124).

Trainer 232 is configured to manage the training of VL-based classifier 234. Trainer 232 is configured to include the functionality of an image embedder (such as image embedder 114) and a textual embedder (such as the textual embedder 128). Trainer 232 is also configured to include the functionality of an image-text correlator (such as image-text correlator 140).

VL-based classifier 234 is configured to classify input images (such as the pre-classified labeled images from image dataset 110 into one or more of multiple classifications based upon the projection matrix (Wx). The projection matrix is a correlation of the image embedding vector (x) and the textual embedding vector matrix (W) from the output of the textual encoders of the differing sentences ($s_1$ and $s_2$).

Once trained, the VL-based classifier 234 is optimized with parameters 240, stored in local memory, a database, and/or an external device on the external communication network 230. The stored parameters 240 include the optimized sentences (e.g., $s_1$ and $s_2$) and other classifier parameters (e.g., θ). With these stored parameters 240, the trained VL-based classifier 234 may effectively categorized input images, so there is a high resemblance between positive input images and the optimized sentences. Consequently, the trained VL-based classifier 144 may successfully make complex classifications of unclassified images.

As part of the VL-based classifier 234 training, sentence generation manager 236 manages and directs the automated sentence generators to iteratively adjust or change the input sentences. In some implementations, sentence generation manager 236 alternatively adjusts one sentence at a time by adding or changing one or more words in a sentence. For example, in one iteration, sentence generation manager 236 directs an automated sentence generator to add a word to a first input sentence (e.g., $s_1$) while leaving a second input sentence (e.g., $s_2$) unchanged. In the next iteration of the training, sentence generation manager 236 directs the automated sentence generator to add a word to the second input sentence (e.g., $s_2$) while leaving the first input sentence (e.g., $s_1$) unchanged.

In some implementations, one or more of the automated sentence generators are modules of data and machine-readable instructions stored in the system memory 204. In other implementations, one or more of the automated sentence generators are external modules or services accessed via the external communication network 230.

As part of the VL-based classifier 234 training, optimizer 238 determines the optimized set of differing textual sentences of the superset of textual sentences. The optimized set of differing textual sentences is those that have a minimal classification loss of the VL-based classifier when classifying the pre-classified images. That is, the optimized set of differing textual sentences has the lowest classification loss amongst the others of the superset.

Figure 3:
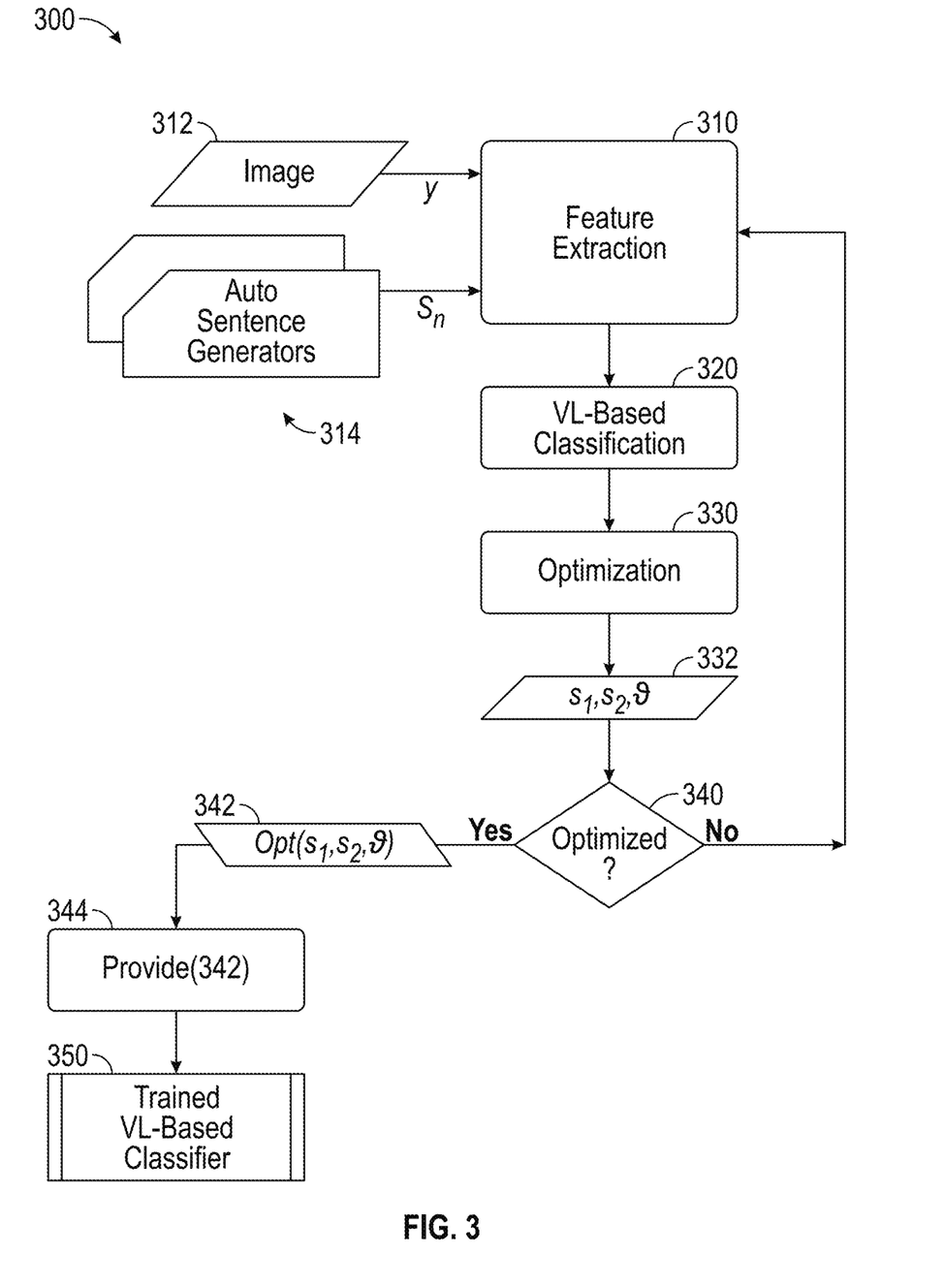
FIG. 3 is a flowchart illustrating a process to perform an example method that facilitates the optimization of VL-based classifiers with text embeddings, in accordance with one or more implementations described herein.

FIG. 3 is a flowchart that illustrates process 300 to perform an example method that facilitates optimization of VL-based classifier with textual embeddings. For case of illustration, process 300 may be described as being performed by a system described herein. Such a system may be, for example, computing system 200. Process 300 represents the training of the VL-based classifier to find optimized parameters, such as text embeddings.

At operation 310, the system performs feature extraction using a VLM for each training iteration. This operation includes generating an image embedding from an image encoding of pre-classified images from an image dataset 312 using a pre-trained image encoder. As depicted, $y_n$ represents a sample image utilized for each iteration of the classifier's training. $y_n$ is one sample image of the multiple (i.e., n) images of the pre-classified images.

Operation 310 also includes the generation of textual embeddings from a textual encoding of the set of differing textual sentences (e.g., $s_1$ and $s^2$) using a pre-trained textual encoder. As depicted, automated sentence generators 314 produce iteratively adjusted or changed sentences for each iteration. In some implementations, automated sentence generators 314 are provided with the same prompt sentence. In some implementations, automated sentence generators 314 alternatively adjust one sentence at a time by adding or changing one or more words in a sentence.

At operation 320, the system performs VL-based classification for each iteration. This includes, for example, a classification of the pre-classified labeled images into one or more of multiple classifications based upon a correlation of the image embedding and textual embedding.

Collectively, each iteration of operations 310 and 320 may be described as the system tunes the VL-based classifier employing a pre-trained image encoder of a VLM for imaging embedding of pre-classified images and the pre-trained textual encoder of the VLM for the textual embedding of each iterative set of differing textual sentences.

At operation 330, the system performs an optimization calculation based upon the classification loss of the pre-classified image for each iteration based, at least in part, upon a unique combination of different sentences (e.g., $s_1$ and $s_2$). Operation 330 may calculate cross-entropy (CE) loss to determine classification loss or error.

Operation 330 performs the optimization calculation, for example, in accordance with equation 160 shown in FIG. 1 described above. This calculation produces parameters 332, such as $s_1$, $s_2$, and $\theta$, that were used for that iteration of the tuning of the classifier.

At operation 340, the system determines whether parameters 332 are now optimized. This determination may be based on a lack of improvement of parameters 332 in subsequent iterations. The best or optimized parameters are those that minimized the classification loss, such as is calculated using equation 160. Thus, the system identifies the combination of iteration parameters that produced the minimized classification loss.

If the parameters 332 are not yet optimized, process 300 returns to operation 310 to perform another iteration. If the parameters 332 are not yet optimized, then the system identifies the optimized parameters 342 (e.g., Opt($s_1$, $s_2$, $\theta$).

Collectively, operations 330 and 340 may be described as the system determining an optimized set of differing textual sentences of a superset of textual sentences, wherein the optimized set of differing textual sentences has a minimal classification loss of the VL-based classifier when classifying the pre-classified images.

More particularly, operations 330 and 340 may be further described as the system iteratively repeats the tuning of the VL-based classifier. Each iteration includes supplying another set of differing textual sentences of the superset of textual sentences. Each set of differing textual sentences includes at least one iteratively unique textual sentence of the superset.

Furthermore, for each iteration, the system tracks a classification loss associated with each iteration's set of differing textual sentences. It identifies the optimized set of differing textual sentences of the superset associated with the minimal classification loss of the VL-based classifier when classifying the pre-classified images.

At operation 344, the system provides the optimized parameters 342. For example, the system may provide the optimized set of differing textual sentences (e.g., Opt($s_1$, $s_2$,)) for use with the trained VL-based classifier in classifying unclassified images. The trained VL-based classifier is depicted as block 350.

The above description is intended to be illustrative and not restrictive. While the dimensions and types of materials described herein are intended to be illustrative, they are by no means limiting and are exemplary embodiments. In the following claims, use of the terms "first," "second", "top", "bottom", etc. are used merely as labels and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51% to 99% out of a possible extent of 100%", and do not necessarily mean "perfectly", "completely", "strictly", "entirely" or "100%". Additionally, the word "proximate" may be used herein to describe the location of an object or portion thereof concerning another object or portion thereof, and/or to describe the positional relationship of two objects or their respective portions thereof concerning each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems, and compositions of matter, and to perform methods, according to this disclosure. It is the following claims, including equivalents, which define the scope of the present disclosure.

What is claimed is:

1. A method that facilitates optimization of vision-language (VL) based classifier with textual embedding, the method comprising:
   tuning the VL-based classifier employing a pre-trained image encoder of a visual-language model (VLM) for imaging embedding of pre-classified images and a pre-trained textual encoder of the VLM for textual embedding of a set of differing textual sentences;
   determining an optimized set of differing textual sentences of a superset of textual sentences, wherein the optimized set of differing textual sentences has a minimal classification loss of the VL-based classifier when classifying the pre-classified images; and
   providing the optimized set of differing textual sentences for use with the VL-based classifier in classifying unclassified images, wherein the determining the optimized set of differing textual sentences includes:
      iteratively repeating the tuning of the VL-based classifier, where each iteration includes supplying another set of differing textual sentences of the superset of textual sentences, wherein each set of differing textual sentences includes at least one iteratively unique textual sentence of the superset;
      for each iteration, tracking a classification loss associated with each iteration's set of differing textual sentences; and
      identifying the optimized set of differing textual sentences of the superset that is associated with the minimal classification loss of the VL-based classifier when classifying the pre-classified images.

2. The method of claim 1, wherein the tuning includes:
   generating the image embedding from an image encoding of the pre-classified images using the pre-trained image encoder;
   generating the textual embedding from a textual encoding of the set of differing textual sentences using the pre-trained textual encoder;
   classifying, by the VL-based classifier, the pre-classified images into one or more of multiple classifications based upon a correlation of the image embedding and textual embedding; and
   determining classification loss of the pre-classified images based, at least in part, on the set of textual sentences.

3. The method of claim 2, wherein the determining the classification loss includes calculating a cross-entropy loss set of differing textual sentences of a superset of textual sentences.

4. The method of claim 1, wherein the tuning includes:
   image encoding pre-classified images using the pre-trained image encoder;
   generating an image embedding vector (x) from output of the image encoding;
   textual encoding the set of textual sentences using the pre-trained textual encoder;
   generating a textual embedding vector matrix (W) from output of the textual encoding;
   correlating the image embedding vector and textual embedding vector matrix to produce a projection matrix (Wx); and
   classifying, by the VL-based classifier, the pre-classified images into one or more of multiple classifications based upon the projection matrix; and
   determining classification loss of the pre-classified images based, at least in part, on the set of textual sentences.

5. The method of claim 1, wherein the determining includes employing an automated textual sentence generator.

6. The method of claim 5, wherein the automated textual sentence generator is selected from a group consisting of language models (LMs), large language models (LLMs), Markov models (MMs), recurrent neural networks (RNNs), transformers, template-based generators, rule-based generators, reinforcement learning (RL) based generators, and random word generators.

7. The method of claim 1, wherein the minimal classification loss is associated with the optimized set of differing textual sentences that is characterized as having a least classification loss produced by the VL-based classifier when classifying the pre-classified images in comparison with other sets of the subset.

8. The method of claim 1 further comprising determining an optimal bias ("θ") of the VL-based classifier with the optimized set of differing textual sentences, wherein the optimal bias is associated with the minimal classification loss of the VL-based classifier when classifying the pre-classified images.

9. A non-transitory machine-readable storage medium encoded with instructions executable by one or more processors that, when executed, direct one or more processors to perform operations of the VL-based classifier produced by method of claim 1, the VL-based classifier employing the optimized set of differing textual sentences for use with the VL-based classifier in classifying unclassified images.

10. A method that facilitates optimization of vision-language (VL) based classifier with textual embedding, the method comprising:
   tuning the VL-based classifier employing a pre-trained image encoder of a visual-language model (VLM) for imaging embedding of pre-classified images and a pre-trained textual encoder of the VLM for textual embedding of a set of differing textual sentences;
   determining an optimized set of differing textual sentences of a superset of textual sentences, wherein the optimized set of differing textual sentences has a minimal classification loss of the VL-based classifier when classifying the pre-classified images, wherein the determining includes employing an automated textual sentence generator; and
   providing the optimized set of differing textual sentences for use with the VL-based classifier in classifying unclassified images, wherein the automated textual sentence generator is selected from a group consisting of language models (LMs), large language models (LLMs), Markov models (MMs), recurrent neural networks (RNNs), transformers, template-based generators, rule-based generators, reinforcement learning (RL) based generators, and random word generators.

11. The method of claim 10, wherein the tuning includes:
   generating the image embedding from an image encoding of the pre-classified images using the pre-trained image encoder;
   generating the textual embedding from a textual encoding of the set of differing textual sentences using the pre-trained textual encoder;

classifying, by the VL-based classifier, the pre-classified images into one or more of multiple classifications based upon a correlation of the image embedding and textual embedding; and determining classification loss of the pre-classified images based, at least in part, on the set of textual sentences, wherein the determining the classification loss includes calculating a cross-entropy loss set of differing textual sentences of a superset of textual sentences.

12. The method of claim 10, wherein the determining includes:

iteratively repeating the tuning of the VL-based classifier, where each iteration includes supplying another set of differing textual sentences of the superset of textual sentences, wherein each set of differing textual sentences includes at least one iteratively unique textual sentence of the superset;

for each iteration, tracking a classification loss associated with each iteration's set of differing textual sentences; and identifying the optimized set of differing textual sentences of the superset that is associated with the minimal classification loss of the VL-based classifier when classifying the pre-classified images.

13. The method of claim 10, wherein the pre-classified images, encoded by the image embedding when tuning the VL-based classifier consists of twenty or fewer images.

14. The method of claim 10, wherein the automated textual sentence generator includes the language models (LMs) or the large language models (LLMs).

15. A non-transitory machine-readable storage medium encoded with instructions executable by one or more processors that, when executed, direct one or more processors to perform operations that facilitates optimization of vision-language (VL) based classifier with textual embedding, the operations comprising:

tuning the VL-based classifier employing a pre-trained image encoder of a visual-language model (VLM) for imaging embedding of pre-classified images and a pre-trained textual encoder of the VLM for textual embedding of a set of differing textual sentences;

determining an optimized set of differing textual sentences of a superset of textual sentences, wherein the optimized set of differing textual sentences has a minimal classification loss of the VL-based classifier when classifying the pre-classified images, wherein the determining includes employing an automated textual sentence generator; and providing the optimized set of differing textual sentences for use with the VL-based classifier in classifying unclassified images, wherein the automated textual sentence generator is selected from a group consisting of language models (LMs), large language models (LLMs), Markov models (MMs), recurrent neural networks (RNNs), transformers, template-based generators, rule-based generators, reinforcement learning (RL) based generators, and random word generators.

16. The non-transitory machine-readable storage medium of claim 15, wherein the operations further include:

generating the image embedding from an image encoding of the pre-classified images using the pre-trained image encoder; and generating the textual embedding from a textual encoding of the set of differing textual sentences using the pre-trained textual encoder.

17. The non-transitory machine-readable storage medium of claim 16, further comprising:

classifying, by the VL-based classifier, the pre-classified images into one or more of multiple classifications based upon a correlation of the image embedding and textual embedding; and determining classification loss of the pre-classified images based, at least in part, on the set of textual sentences, wherein the determining the classification loss includes calculating a cross-entropy loss set of differing textual sentences of a superset of textual sentences.

18. The non-transitory machine-readable storage medium of claim 16, wherein the operations further include:

iteratively repeating the tuning of the VL-based classifier, where each iteration includes supplying another set of differing textual sentences of the superset of textual sentences, wherein each set of differing textual sentences includes at least one iteratively unique textual sentence of the superset;

for each iteration, tracking a classification loss associated with each iteration's set of differing textual sentences; and identifying the optimized set of differing textual sentences of the superset that is associated with the minimal classification loss of the VL-based classifier when classifying the pre-classified images.

19. The non-transitory machine-readable storage medium of claim 15, wherein the minimal classification loss is associated with the optimized set of differing textual sentences that is characterized as having a least classification loss produced by the VL-based classifier when classifying the pre-classified images in comparison with other sets of the subset.

20. The non-transitory machine-readable storage medium of claim 15, wherein the automated textual sentence generator includes the language models (LMs) or the large language models (LLMs).

* * * * *